US009557432B2

(12) United States Patent
Truelove et al.

(10) Patent No.: US 9,557,432 B2
(45) Date of Patent: Jan. 31, 2017

(54) SEISMIC INTERPRETATION SYSTEM AND METHOD

(71) Applicant: Schlumberger Technology Corporation, Sugar Land, TX (US)

(72) Inventors: Leigh Truelove, Cranleigh (GB); Martyn Bradley Beardsell, Bampton (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 659 days.

(21) Appl. No.: 13/791,935

(22) Filed: Mar. 9, 2013

(65) Prior Publication Data

US 2013/0235695 A1    Sep. 12, 2013

Related U.S. Application Data

(60) Provisional application No. 61/608,863, filed on Mar. 9, 2012.

(51) Int. Cl.
*G01V 1/36*    (2006.01)
*G01V 1/28*    (2006.01)

(52) U.S. Cl.
CPC .............. *G01V 1/364* (2013.01); *G01V 1/282* (2013.01); *G01V 2210/20* (2013.01); *G01V 2210/66* (2013.01); *G01V 2210/74* (2013.01)

(58) Field of Classification Search
CPC .... G01V 1/282; G01V 1/364; G01V 2210/20; G01V 2210/66; G01V 2210/74
USPC ........................................................ 367/43
See application file for complete search history.

(56) References Cited

U.S. PATENT DOCUMENTS

| 3,882,446 | A | * | 5/1975 | Brittian et al. ................. 367/71 |
| 4,800,539 | A | * | 1/1989 | Corn et al. ...................... 367/72 |
| 5,802,353 | A | * | 9/1998 | Avila et al. ..................... 703/13 |
| 6,138,076 | A | * | 10/2000 | Graf et al. ...................... 702/14 |
| 7,355,923 | B2 | * | 4/2008 | Reshef ................... G01V 1/362 367/38 |
| 2009/0231955 | A1 | * | 9/2009 | Barnes ..................... G01V 1/30 367/43 |

OTHER PUBLICATIONS

Salvador, et al., "An Interaction Model for Scientific Visualization Using Sound," Proceedings of the XVI Brazilian Symposium on Computer Graphics and Image Processing (SIBGRAPI'03), 2003, 8 pp.*

* cited by examiner

*Primary Examiner* — Daniel L Murphy
(74) *Attorney, Agent, or Firm* — Alec J. McGinn (57) ABSTRACT

The present disclosure describes a system, method and computer readable medium capable of identifying and filtering erroneous seismic data from the computer modeling process. A visual representation of seismic data pertaining to a subterranean formation may be generated and displayed upon a graphic user interface utilizing one or more color schemes. A filtering arrangement may be applied to the seismic data and the visual representation may be updated to include one or more indications illustrating seismic data that has been selected for filtering. The user may adjust filtering operations utilizing a computer generated selection tool. In one embodiment, the system provides a suggestion tool capable of alerting the user to potential seismic data filtering problems.

16 Claims, 6 Drawing Sheets

HORIZON MODELING

MODEL HORIZONS | HINTS

✎ EDIT EXISTING: MWI - HORIZONS ▶    ☐ REFINE AND CREATE ZONE MODEL

HORIZON MODELING TECHNIQUE: VOLUME BASED MODELING ▶    △ UNREFINED MODEL : COARSE RESOLUTION

COMPUTE HORIZONS | COMMON SETTINGS | FAULT SETTINGS | ALGORITHM SETTINGS

| INDEX | HORIZON | SEQUENCE | COLOR | STATUS | HORIZON TYPE | CONFORMS TO | SMOOTHNESS | WELL TOPS | NON-FILTERED DATA | ISOCHORE | INPUT #1 |
|---|---|---|---|---|---|---|---|---|---|---|---|
| 1 | H1 | 1 | ▶ | ✳ NEW | CONF ▶ | NONE ▶ | 35 | ⇧ | ⇧ | ⇧ | ⇧ H1 |
| 2 | H2 | 1 | ▶ | ✳ NEW | CONF ▶ | NONE ▶ | 35 | ⇧ | ⇧ | ⇧ | ⇧ H2 |

✓ APPLY    ✓ OK    ✗ CANCEL

SEISMIC INTERPRETATION SYSTEM AND METHOD

CROSS REFERENCE TO RELATED APPLICATIONS

This patent application claims priority upon and incorporates by reference herein, a provisional patent application entitled "Interactive Horizon Interpretation Filtering System and Method," filed on Mar. 9, 2012, Ser. No. 61/608,863.

BACKGROUND

Computer modeling and simulation of seismic interpretation data is a vital component of oil and gas exploration. Such systems might conduct some form of computational processing upon acquired seismic data and then export the processed data to one or more data visualization application(s) for review by authorized personnel. Such systems may also use a color mapping structure to generate graphic visualizations of acquired data to assist users in interpreting and/or analyzing the acquired data.

Seismic interpretation data may vary in quality, continuity and completeness due to varying vintages of seismic data and/or due to the fact that multiple interpretations of the seismic data have been applied during the imaging process. For example, data quality may vary where a fault intersects a horizon in the formation due to poor resolution of seismic data around fault locations in the formation.

There remains a need for a filtering arrangement capable of identifying and filtering erroneous seismic interpretation data from the modeling process so as to prevent processing errors.

SUMMARY

Accordingly, the present disclosure describes a system, method and computer readable medium capable of identifying and filtering erroneous seismic interpretation data from the computer modeling process so as to prevent processing errors.

In one embodiment, seismic interpretation data pertaining to a subterranean formation may be received and stored to a computer-readable storage medium. A visual representation of the processed seismic interpretation data may be generated and displayed upon a graphic user interface utilizing one or more color schemes. The visual representation may include one or more features of the formation, such as horizons and faults contained therein.

In one embodiment, a software generated filtering arrangement capable of filtering out erroneous data from the model may be generated and applied to the seismic interpretation data such that the filtered data is ignored going forward. In one embodiment, the filter may be applied to each individual piece of seismic data using a boolean expression.

The system, method and computer readable medium described herein provides various options through which the user may generate, control and adjust the filter or filtering arrangement. Specifically, the user may decide how to apply the filter as well as the values that the filter will use via one or more settings screens. In one embodiment, the user may select whether to apply a filter to the entire formation, to one or more horizons in the formation, or to one or more faults in the formation.

In one embodiment, selecting a filter will activate the filter and generate a seismic interpretation data representation to show the effect of the selected filter on the seismic interpretation data. In one embodiment, the system provides at least one computer generated selection tool through which the user may select/unselect seismic data for filtering.

In one embodiment, the selection tool may provide a substantially rectangular outline (for 2D displays) or a substantially cubic outline (for 3D and 4D displays) superimposed upon or embedded into the seismic interpretation data. The user may utilize the selection tool to filter erroneous seismic interpretation data by moving the selection tool to encompass the erroneous data and activating the filter using a mouse or other input device.

In one embodiment, updated seismic data representation(s) may be provided to the user (delayed or in real time) as he or she selects seismic interpretation data for filtering. The updated representation may include one or more indications illustrating seismic interpretation data that has been selected for filtering. In one embodiment, a visual and/or auditory indication may be utilized to indicate that the selected data has been selected for filtering. This feature allows the user to see how the seismic interpretation data will be affected by the filtering operation, in context with the identified features of the formation, prior to the application of the filter. Further, it allows the user to amend and/or adjust his or her filtering selections before the selected data is ignored during subsequent processing.

In one embodiment, the filter may be restricted to seismic interpretation data positioned adjacent to one or more identified faults in the subterranean formation. In one embodiment, the user may enter a distance value for all or some of the faults in the formation so that the filter will be applied only to seismic data residing within the specified distance from the fault.

In one embodiment, the system may provide data entry fields for the user to enter filtering values separately for each side of a fault. Further, the selection tool allows the user to apply a non-linear filtering arrangement to one or both sides of a fault such that the filtering value for the fault varies depending on the seismic data's position along the length of the fault.

In one embodiment, the system provides a suggestion tool capable of alerting the user if a potential filtering problem exists, i.e., where too much or too little data is being filtered, and/or recommending a filter size for one or more faults given the fault's size and location relative to other faults in the formation.

This summary is provided to introduce a selection of concepts in a simplified form that are further described herein. This summary is not intended to identify key or essential features of the claimed subject matter, nor is it intended to be used as an aid in determining the scope of the claimed subject matter.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings; it being understood that the drawings contained herein are not necessarily drawn to scale and that the accompanying drawings provide illustrative implementations and are not meant to limit the scope of various technologies described herein; wherein.

DETAILED DESCRIPTION

In the following description, numerous details are set forth to provide an understanding of various embodiments of the invention. However, it will be understood by those skilled in the art that the invention may be practiced without these details and that numerous variations or modifications from the described embodiments may be possible.

The present disclosure describes embodiments of a method of modeling a subterranean formation, a computer readable medium for modeling a subterranean formation and a computer modeling system. Seismic data pertaining to a subterranean formation may be received and stored, as illustrated by Box (10) of FIG. 1. Such data may be received directly from oilfield sensing equipment (12) or via a database (14) containing seismic data. In certain embodiments, such data may be received from a computer-readable storage medium (not shown).

Figure 1:
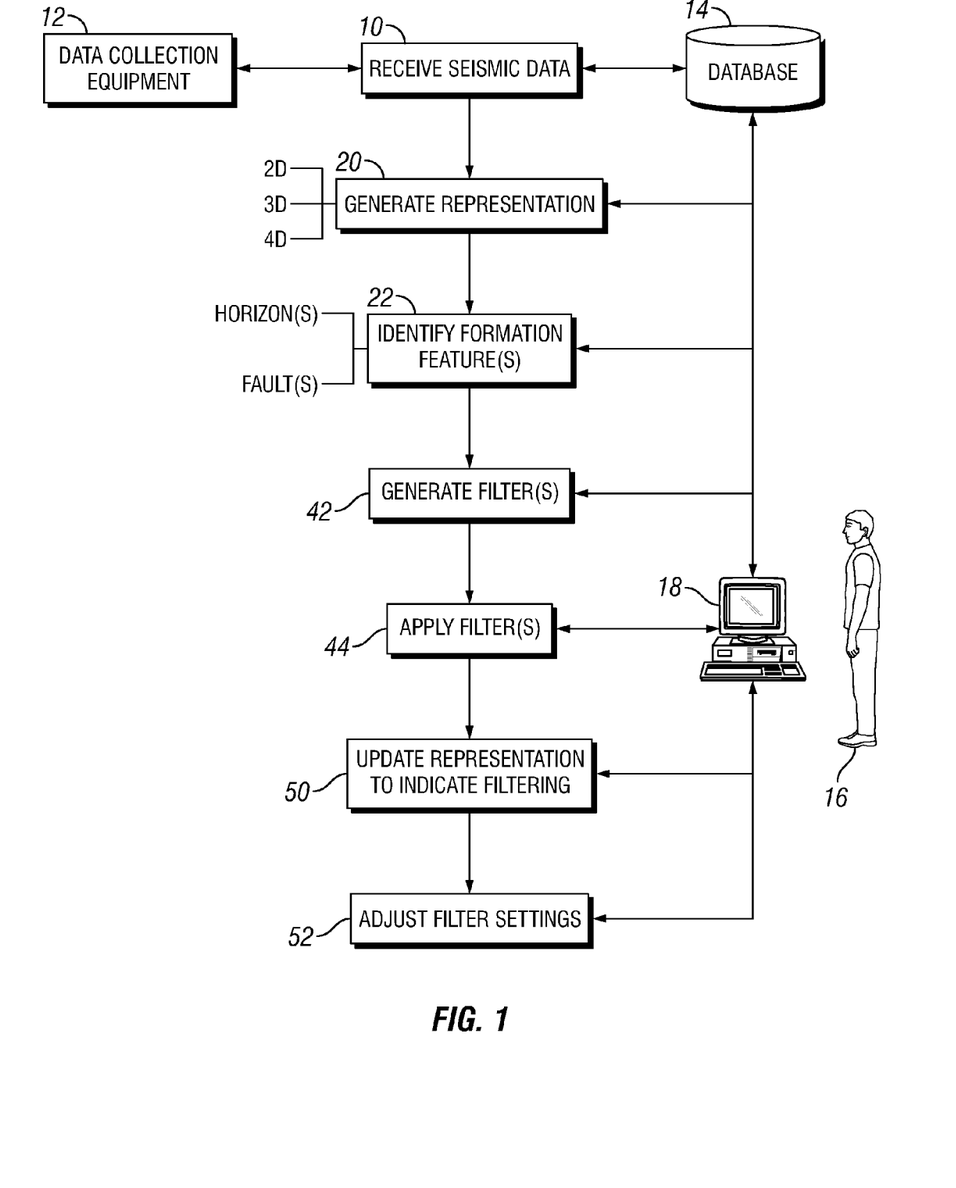
FIG. 1 is a flowchart diagram illustrating a filtering process of one example embodiment.

In one embodiment, seismic data may be processed and presented to the user (16) via a graphic user interface (18). This may be accomplished by generating a visual representation of the processed seismic data, as illustrated by Box (20). In one embodiment, features of the subterranean formation may be identified and included in the representation, as illustrated by Box (22). For example, horizons in the formation, i.e., horizontal or sub-horizontal layers of rock, may be identified by one or more sets of seismic reflectors in lateral succession having similar amplitude values. Faults in the formation, i.e., vertical or sub-vertical breaks in the formation across which there is an observable displacement, may be identified by gaps or disconnections in the seismic reflectors.

In one embodiment, a data visualization application capable of accessing, processing and displaying acquired seismic data upon one or more graphic user interfaces (18) may be utilized. The data visualization application may be a stand-alone application, such as the Petrel® system offered by Schlumberger, or a proprietary data visualization package.

In one embodiment, the seismic data may be displayed to the user using a two, three, or four dimensional arrangement. In one embodiment, a two dimensional arrangement may include x and y axis components, a three dimensional arrangement may include x, y, and z components, and a four dimensional arrangement may include x, y, z components along with a time component. Seismic data may be represented utilizing any number of conventions. For example, various color schemes may be utilized to convey the characteristics of the displayed seismic data.

Figure 2:
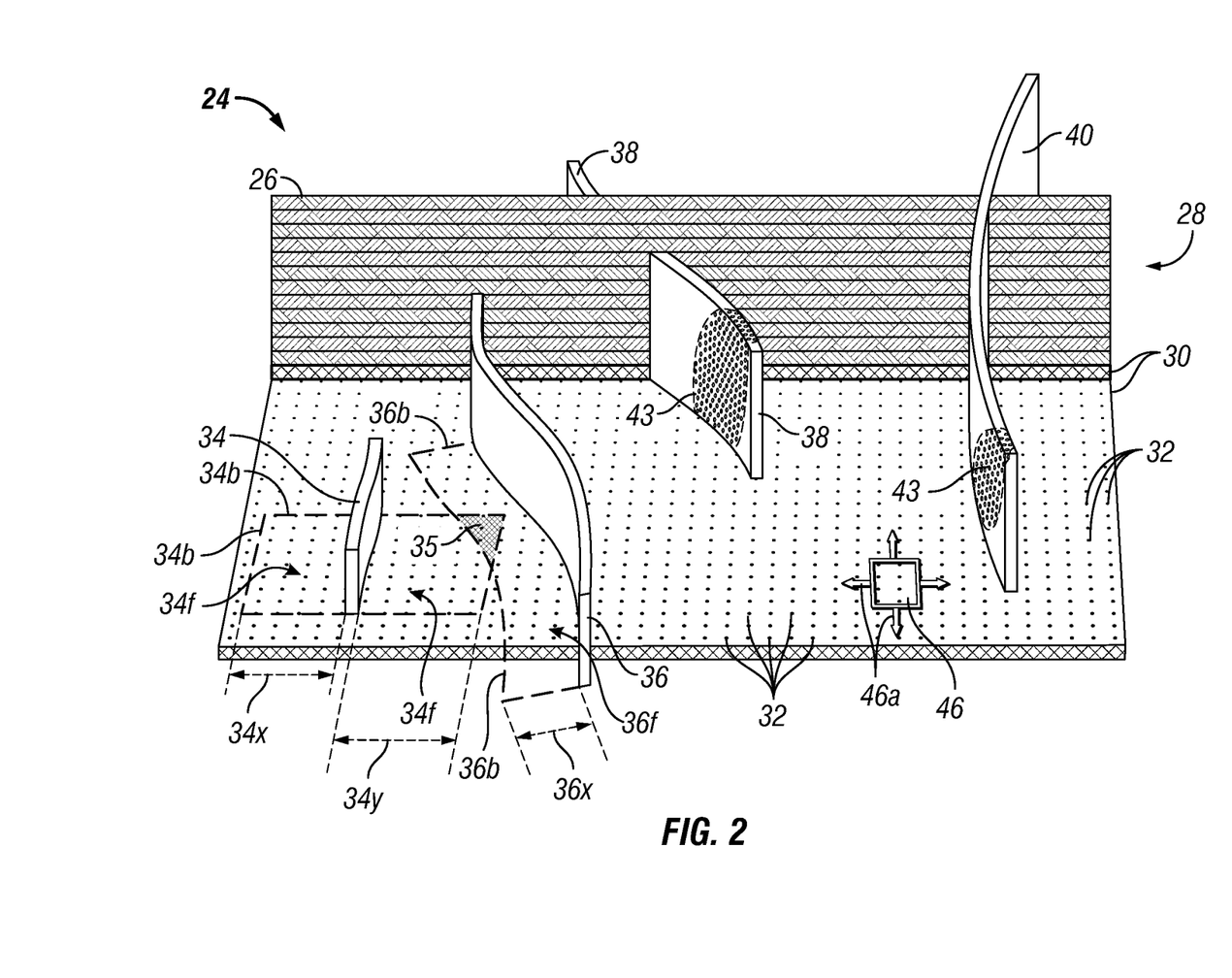
FIG. 2 illustrates a 3D visualization of seismic data of one example embodiment.

FIG. 2 provides an example three dimensional display of seismic data concerning a subterranean formation (24) of interest. In this example, acquired seismic data has been processed by a data visualization application and displayed according to a 3D color arrangement. The example representation of FIG. 2 illustrates the earth's surface (26) and a plurality of horizons (28) identified for the subterranean formation (24). Example horizon (30) has been selected for review in this example and individual seismic data points (32) pertaining to the example horizon are illustrated for the user's convenience. FIG. 2 further illustrates a number of faults (34, 36, 38 and 40) identified in example horizon (30).

As noted above, geological modeling involves a great deal of data quality assessment. Seismic data may vary in quality, continuity and completeness due to varying vintages of seismic data and/or due to the fact that multiple interpretations of the seismic data have been applied during the imaging process. For example, data quality may vary where a fault intersects a horizon in the formation due to poor resolution of seismic data around fault locations in the formation. Erroneous seismic interpretation data may be identified and removed from the modeling process so as to prevent processing errors.

In one embodiment, a software generated filtering arrangement capable of filtering out erroneous data from the model may be generated and applied to the seismic interpretation data, as illustrated by Boxes (42) and (44) of FIG. 1. In one embodiment, filtered data may be ignored during subsequent modeling operations.

In one embodiment, the filter may be applied to each individual piece of seismic interpretation data using a boolean expression such that the value of the boolean expression associated with the piece of seismic interpretation data indicates whether at least a portion of seismic interpretation data will be subjected to the filter. Boolean expression values/attributes may be true/false, zero/one, yes/no, or any other suitable convention capable of indicating whether a piece of data will be subjected to the filter. Boolean expression values may be associated with, and/or stored with, individual pieces of seismic interpretation data or as part of a seismic project so that the filter "travels with" the model if it is transferred and/or stored upon another database or computer-readable storage medium.

The system, method and computer readable medium described herein provides various options through which the user may generate, control and adjust the filter or filtering arrangement. Specifically, the user may decide how to apply the filter as well as the values that the filter will use. In one embodiment, the user may select whether to apply a filter to the entire formation, to one or more horizons in the formation, or to one or more faults in the formation. This may be accomplished by clicking on the representation of a particular horizon or fault to bring up a settings menu.

Figure 3:
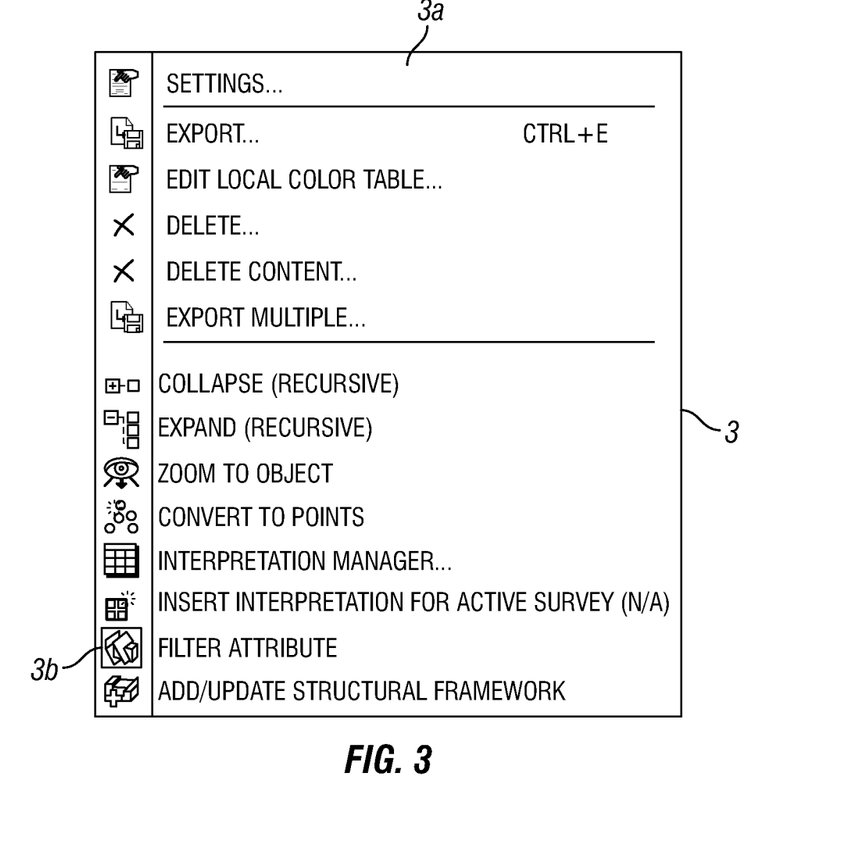
FIGS. 3-5 are example graphic user interfaces that may be used in conjunction with one or more example embodiments.
Figure 4:
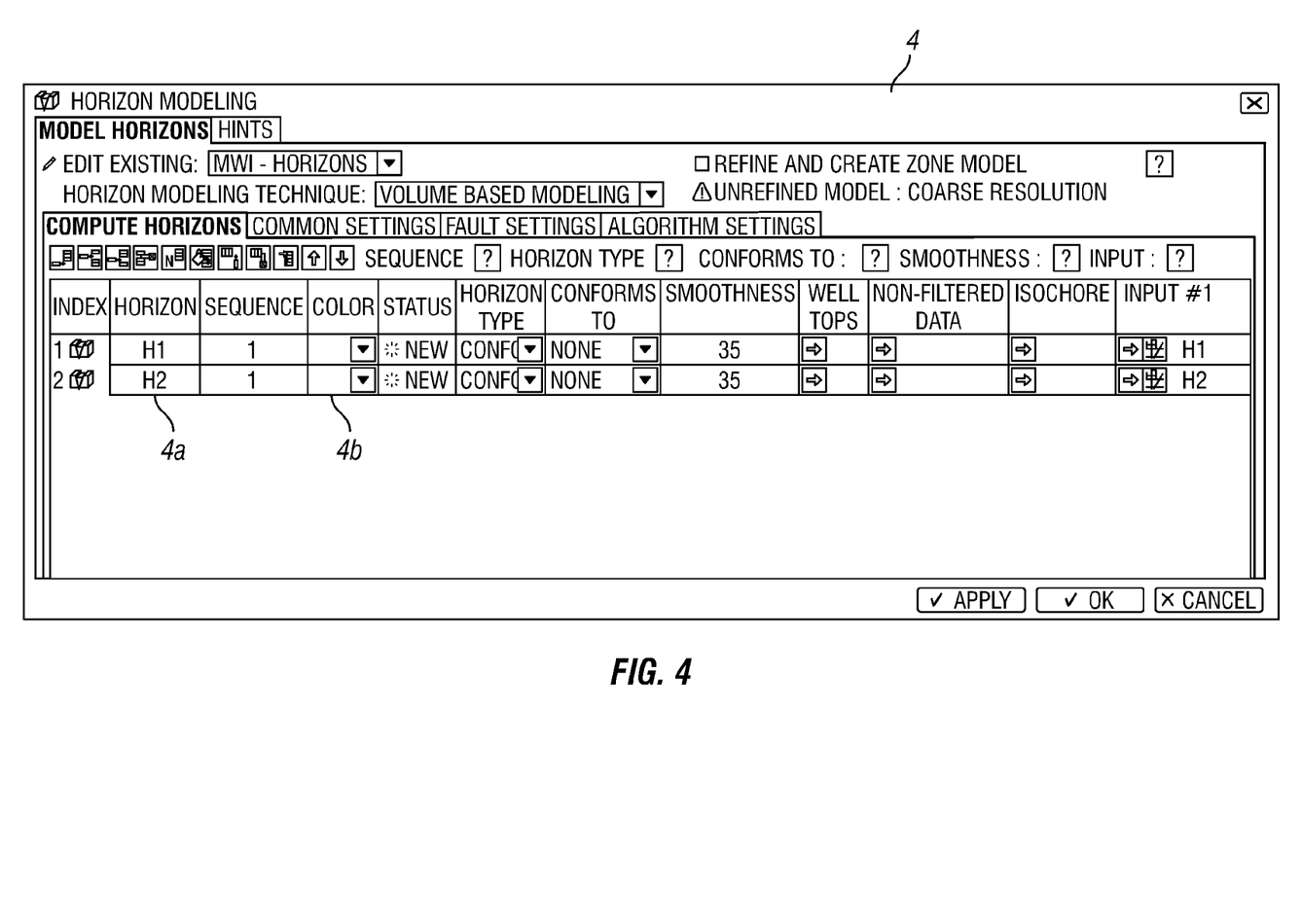
Figure 5:
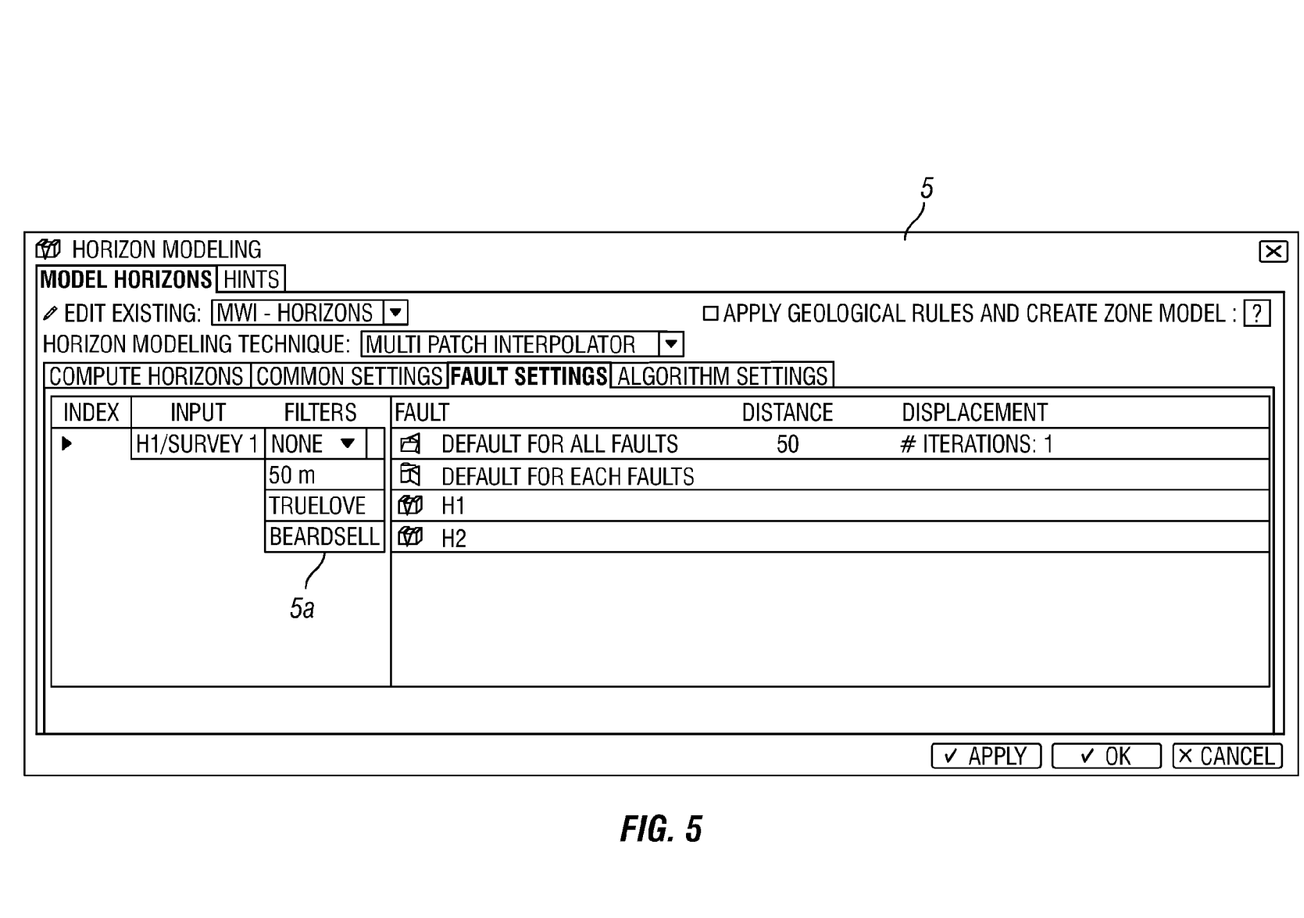

FIG. 3 provides an example settings menu (3) through which the user may access detailed settings screens using the "settings" tab (3a) and/or specify/alter filter settings via the "filter attribute" tab (3b). FIG. 4 provides an example settings screen (4) through which the user may select horizons (4a) to be included in the model and colors (4b) to be associated thereto. FIG. 5 provides an example settings screen (5) through which the user may save, access and/or alter one or more filtering arrangements.

In the example of FIG. 5, a drop down menu (5a) is provided where the user may select from a plurality of filter arrangements. In this example, the user may select from a 50 meter default filtering arrangement entitled "50 m", a custom filtering arrangement entitled "Truelove," or a custom filtering arrangement entitled "Beardsell." In one embodiment, selecting a filter will activate the corresponding filter and generate a seismic data representation to show the effect of the selected filter on the seismic data.

In one embodiment, the system provides at least one computer-generated selection tool through which the user (16) may select seismic data for filtering. In one embodiment, the selection tool comprises a substantially rectangular outline (e.g., for 2D displays) or a substantially cubic outline (for 3D and/or 4D displays) superimposed upon or embedded into displayed seismic data.

In the example of FIG. 2, the system provides a graphic selection tool (46) superimposed upon the displayed seismic interpretation data (32) such that the user may select seismic data of interest. As noted above, the user has chosen to look at horizon (30) of subterranean formation (24) in this example. In one embodiment, the selection tool (46) may be resized or moved in any direction by the user using a mouse, keyboard or other desired input device, as illustrated by arrows (46a). Further, multiple selection tools (or cubes in this example) may be utilized such that the user may select at least a portion of seismic interpretation data or multiple portions of seismic interpretation data.

In one embodiment, the selection tool may include interactive features such as a snap-to-grid feature wherein the outer limits of the selection tool automatically conform to the grid utilized by the data visualization application. In one embodiment, the selection tool may also provide a conforming feature wherein the outer limits of the selection tool may conform to features of the displayed seismic data such as along seismic trace lines, fault boundaries, etc. In one embodiment, the conforming feature may also be utilized to conform to seismic data trends such as areas of displayed data trending from lower to higher amplitude values, depth values, etc.

FIG. 2 illustrates an example situation where seismic interpretation data for selected horizon (30) does not correctly match faults (38) and (40). Specifically, FIG. 2 shows a series of example seismic data points (43) that are incorrectly represented such that they "cut through" identified faults (38) and (40). The erroneous seismic interpretation data (43) in this example is surrounded by ovals for ease of illustration. In this example, the user may utilize the graphic selection tool (46) to filter out the erroneous seismic interpretation data (43) by resizing and/or moving the graphic selection tool to encompass the erroneous data (43) and activating the filter.

The filter may be activated according to any number of conventions. In one embodiment, the user may left click the mouse to apply an already active pre-existing filter to the data selected by the selection tool, right click the mouse to bring up a settings menu and/or various settings screens to create a new filter and/or select from a menu of pre-existing filters to apply to the data, as discussed further above.

In one embodiment, updated seismic data representation(s) may be provided to the user (delayed or in real time) as he or she selects seismic interpretation data for filtering. The updated representation may include one or more indications illustrating seismic interpretation data that has been selected for filtering as illustrated by Box (50) of FIG. 1. In one embodiment, a visual and/or auditory indication may be utilized to indicate that the selected data has been selected for filtering. For example, a color change and/or auditory alert may be utilized to convey that one or more pieces of seismic data will be subjected to the filter as per user inputs, and thus will be ignored during subsequent processing.

In one embodiment, the indication(s) may include changes to the display color of the selected seismic interpretation data, such as the use of a red color scheme to indicate that seismic interpretation data has been selected for filtering. This feature allows the user to see how the seismic data will be affected by the filtering operation in context with the identified features of the formation, prior to the application of the filter. Further, it allows the user to amend and/or adjust his or her filtering selections before the selected data is ignored during subsequent processing, as illustrated by Box (52) of FIG. 1.

In one embodiment, data that has not been selected for filtering may maintain its original color scheme. For example, unfiltered data may be given a blue or a green color scheme. Further, data that has been selected for filtering and then deselected by the user may have its color scheme changed from a red color scheme to an orange or a yellow color scheme. In this example, the change from blue/green (unfiltered) to red (selected for filtering), to yellow/orange (deselected for filtering) conveys the state of the seismic data in an efficient manner.

In one embodiment, the filter may be restricted to seismic data positioned adjacent to one or more identified faults in the subterranean formation. As noted above, data quality issues may be a problem where one or more faults intersect the horizon. In one embodiment, the user may enter a distance value for some or all of the faults in the formation so that the filter will be applied only to seismic data residing within the specified distance from the fault(s). This may be accomplished via one or more settings screens as described above.

For example, if the user sets a specified distance ($34x$ and/or $34y$) of 50 meters from either side of fault (34), any seismic data residing within 50 meters of either side of fault (34) where it intersects with horizon (30) will be subjected to the filter. FIG. 2 illustrates areas ($34f$) where the filter would be applied utilizing a 50 meter filter value to each side of fault (34). In one embodiment, the system may provide data entry fields for the user to enter filtering values separately for each side of one or more faults. That is, the user may enter one distance value to a first side of the fault and another value for the second side of the fault so that the filtering is varied depending on which side of the fault is at issue.

In some instances, the selection tool may not be the ideal starting point for filtering seismic interpretation data pertaining to a subterranean formation. This may be the case for complicated subterranean formations having a significant number of faults, i.e., such that it may be impractical for the user to manually select all data that will be subjected to filtering. However, applying a static filtering arrangement to a complicated formation may result in a condition where too much or too little data is subjected to the filter. For example, consider a situation where there are a number of faults in a formation and the faults are of varying lengths and/or overlap with each other.

The use of a static filtering value for multiple faults, such as the 50 meter distance example provided above, may cause an overlap situation where too much seismic data is removed between faults. FIG. 2 illustrates an example situation where a 50 meter filtering value is utilized in connection with faults (34) and (36), resulting in the filtering of data within areas ($34f$) and ($36f$). ($36x$) illustrates a 50 meter filtering distance value for fault (36) in this example.

Due to the size of the example filtering value and the distance between example faults (34) and (36), one can see that an entire section (35) of seismic data between the faults will be removed due to the filtering operation. This is an example situation where too much data may be removed due to the use of a static filtering arrangement.

However, in one embodiment, the selection tool (46) provides a convenient solution to this problem. In this example, the user can bring up the selection tool (46), move the tool so that it encompasses some or all of the data in section (35), and reverse the filtering operation for one or more desired seismic interpretation data points. This may be accomplished using a single mouse click to deactivate the filter for selected seismic interpretation data points, by right clicking to access a drop down menu and/or settings menu where a filtering option may be unselected, etc.

In this example, the user may utilize a default filtering arrangement and then tailor the filter to his or her preference using the selection tool to select and deselect seismic interpretation data to be filtered. The use of the selection tool in this example also allows the user to apply a non-linear filtering arrangement to one or both sides of fault(s) (34) and (36) such that the filtering value for the fault varies depending on the seismic data's position along the length of the fault.

In one embodiment, the filtering areas illustrated by the system after a filtering arrangement has been applied, such as areas (34*f*) and/or (36*f*) in the example of FIG. 2, may be manually adjusted by the user to increase or decrease the number of seismic interpretation data points that will be filtered. Specifically, the user may click upon a portion of any of the displayed boundary lines (illustrated as 34*b* and 36*b* in this example) and manually adjust the area of seismic data encompassed by the boundary (and thus the filtering) by moving the position of the boundary line.

In one embodiment, moving a displayed boundary line causes the system to change the filtering attribute and the displayed color scheme for any seismic data points affected by movement of the boundary. This feature of the system allows the user to apply a non-linear filtering arrangement to individual faults such that the filtering values for the fault may be different depending on the seismic data's position along the length of the fault.

In one embodiment, the system provides a suggestion tool capable of alerting the user if a potential filtering problem exists, i.e., where too much or too little data may be filtered, and/or recommending a filter size for each fault given the fault's location and distances relative to other faults. In one embodiment, this may be accomplished by calculating a minimum and/or a maximum distance between each fault (or selected faults) in the formation. For example, if the filter value is greater than the maximum distance between two faults, an alert to the user and/or a recommendation of a filter value smaller than the maximum distance may be provided.

In one embodiment, the system may calculate the number of seismic interpretation data points positioned between any two faults in the formation and provide an alert and/or filter value recommendation if the number or percentage of data points to be filtered between any two faults is less than or greater than a threshold number or percentage. The threshold number or percentage value may be pre-programmed or entered by the user using the settings menu and/or one or more settings screens.

The system may be utilized in conjunction with any suitable visualization package, and the use of complimentary and/or supplementary filtering arrangements described herein is not limited to use with the example data or example data visualization packages. Further, the invention may be used at any phase of an oilfield operation including, but not limited to, during the interpretation of seismic data, during modeling of formational characteristics or reservoir properties (including surface modeling), and/or during operational monitoring and analysis activities.

Figure 6:
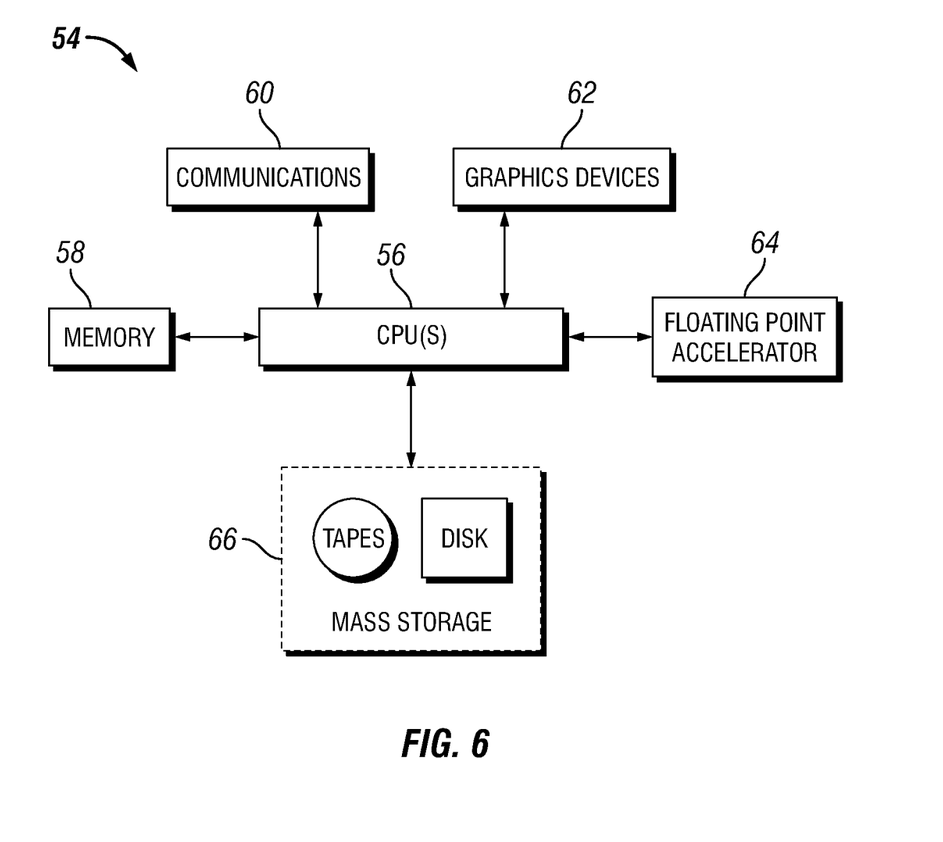
FIG. 6 is a schematic illustration of a computer system of one example embodiment.

The methods described herein may be implemented on any suitable computer system capable of processing electronic data. FIG. 6 illustrates one possible configuration of a computer system (54) that may be utilized. Computer system(s), such as the example system of FIG. 6, may run programs containing instructions, that, when executed, perform methods according to the principles described herein. Furthermore, the methods described herein may be fully automated and able to operate continuously, as desired.

The computer system may utilize one or more central processing units (56), memory (58), communications or I/O modules (60), graphics devices (62), a floating point accelerator (64), and mass storage devices such as tapes and discs (66). Storage device (66) may include a floppy drive, hard drive, CD-ROM, optical drive, or any other form of storage device. In addition, the storage devices may be capable of receiving a floppy disk, CD-ROM, DVD-ROM, disk, flash drive or any other form of computer-readable medium that may contain computer-executable instructions. Further communication device (60) may be a modem, network card, or any other device to enable communication to receive and/or transmit data. It should be understood that the computer system (54) may include a plurality of interconnected (whether by intranet or Internet) computer systems, including without limitation, personal computers, mainframes, PDAs, cell phones and the like.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies.

In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

The computer system (54) may include hardware capable of executing machine readable instructions, as well as the software for executing acts that produce a desired result. In addition, computer system (54) may include hybrids of hardware and software, as well as computer sub-systems.

Hardware may include at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

A database may be any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform.

Further, the computer system may operate in a networked environment using logical connections to one or more remote computers. The logical connections may be any connection that is commonplace in offices, enterprise-wide computer networks, intranets, and the Internet, such as local area network (LAN) and a wide area network (WAN). The remote computers may each include one or more application programs.

When using a LAN networking environment, the computer system may be connected to the local network through a network interface or adapter. When used in a WAN networking environment, the computer system may include a modem, wireless router or other means for establishing communication over a wide area network, such as the Internet. The modem, which may be internal or external, may be connected to the system bus via the serial port interface. In a networked environment, program modules depicted relative to the computer system, or portions thereof, may be stored in a remote memory storage device.

Although the invention has been described with reference to specific embodiments, this description is not meant to be construed in a limited sense. Various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention.

What is claimed is:

1. A computer implemented method of modeling a subterranean formation comprising:
   generating a representation of the subterranean formation utilizing seismic data measured using a measuring device, the representation being displayed upon a graphic user interface;
   applying a filter to at least a portion of the representation; the filter comprising a non-linear filter applied to a portion of the representation located adjacent to less than an entire length of a fault;
   determining if applying the filter would result in no seismic data being displayed between any two faults of the subterranean formation;
   displaying a filter error alert if it is determined that applying the filter would result in no seismic data being displayed between any two faults of the subterranean formation;
   providing one or more indications of applying the filter to at least a portion of the representation;
   adjusting the filter utilizing a component of the graphic user interface;
   generating an updated representation of the subterranean formation that omits the filtered portion of the representation; and
   using the updated representation of the subterranean formation to alter one or more parameters of an oilfield operation associated with the subterranean formation.

2. The computer implemented method of claim 1, wherein the filter is applied to seismic data located a specified distance away from at least one side of a fault.

3. The computer implemented method of claim 1, wherein the representation is displayed upon the graphic user interface using a 2D, 3D, or 4D arrangement.

4. The computer implemented method of claim 1, wherein the filter further comprises a computer-generated selection tool controllable by an input device.

5. The computer implemented method of claim 4, wherein the computer-generated selection tool further comprises a settings interface.

6. The computer implemented method of claim 4, wherein the computer-generated selection tool further comprises a substantially rectangular or substantially cubic graphic.

7. A subterranean formation modeling system comprising:
   a computer processor operative to:
      generate a representation of the subterranean formation utilizing seismic data measured using a measuring device, the representation being displayed upon a graphic user interface;
      apply a filter to at least a portion of the displayed seismic data, the filter comprising a non-linear filter applied to a portion of the representation located adjacent to less than an entire length of a fault;
      determining if applying the filter would result in no seismic data being displayed between any two faults of the subterranean formation;
      displaying a filter error alert if it is determined that applying the filter would result in no seismic data being displayed between any two faults of the subterranean formation;
      update the representation of the subterranean formation, the updated representation providing one or more indications of seismic data that will be filtered;
      adjust the filter utilizing the updated representation; and
      use the updated representation of the subterranean formation to alter one or more parameters of an oilfield operation associated with the subterranean formation.

8. The subterranean formation modeling system of claim 7, wherein the filter further comprises a boolean expression.

9. The subterranean formation modeling system of claim 7, wherein the processor is operative to identify at least one fault in the subterranean formation utilizing the seismic data.

10. A non-transitory computer-readable storage medium for modeling a subterranean formation comprising instructions which, when executed, cause a computing device to:
   generate a representation of the subterranean formation utilizing seismic data measured using a measuring device, the representation being displayed upon a graphic user interface;
   apply a filter to at least a portion of the displayed seismic data, the filter comprising a non-linear filter applied to a portion of the representation located adjacent to less than an entire length of a fault;
   determining if applying the filter would result in no seismic data being displayed between any two faults of the subterranean formation;

displaying a filter error alert if it is determined that applying the filter would result in no seismic data being displayed between any two faults of the subterranean formation;

update the representation of the subterranean formation, the updated representation providing one or more indications of seismic data that will be filtered;

adjust the filter utilizing the updated representation; and use the updated representation of the subterranean formation to alter one or more parameters of an oilfield operation associated with the subterranean formation.

11. The computer-readable storage medium of claim 10, wherein the filter is applied to seismic data located a specified distance away from at least one side of a fault.

12. The computer-readable storage medium of claim 10, wherein the representation is displayed upon the graphic user interface using a 2D, 3D, or 4D arrangement.

13. The computer-readable storage medium of claim 10, wherein the filter further comprises a computer-generated selection tool controllable by an input device.

14. The computer-readable storage medium of claim 13, wherein the computer-generated selection tool further comprises a settings interface.

15. The computer-readable storage medium of claim 13, wherein the computer-generated selection tool further comprises a substantially rectangular or substantially cubic graphic.

16. The computer-readable storage medium of claim 10, further comprising providing an alternate filter that would display at least some seismic data between the two faults.

* * * * *